United States Patent [19]
Greutman et al.

[11] 3,763,489
[45] Oct. 2, 1973

[54] SYNCHRO TO SIN/COS CONVERTER

[75] Inventors: Weldon Wayne Greutman, Hicksville, Ohio; Isaac Roger Studebaker, Fort Wayne, Ind.

[73] Assignee: International Telephone and Telegraph Corporation, Nutley, N.J.

[22] Filed: Aug. 2, 1971

[21] Appl. No.: 168,246

[52] U.S. Cl. .............................. 343/10, 343/11 R
[51] Int. Cl. ........................... G01s 7/12, G01s 9/02
[58] Field of Search .......................... 343/10, 11 R

[56] References Cited
UNITED STATES PATENTS

| | | | |
|---|---|---|---|
| 3,377,589 | 4/1968 | Materer et al. | 343/11 R |
| 3,603,997 | 9/1971 | Brouwer et al. | 343/10 |
| 3,395,354 | 7/1968 | Maupin | 343/11 R |
| 2,519,935 | 8/1950 | Smith et al. | 343/11 R X |
| 2,624,043 | 12/1952 | Gerwin et al. | 343/11 R X |

*Primary Examiner*—Malcolm F. Hubler
*Attorney*—C. Cornell Remsen, Jr. et al.

[57] ABSTRACT

A synchro to azimuth sin/cos converter which converts the antenna transmit synchro information to sine and cosine waveforms. This arrangement may be used in a radar system for accurately indicating for example on a Plan Position Indicator (PPI), the azimuth orientation of the antenna, wherein the resultant converted sine and cosine waveforms are immune to noise, harmonics created in the conversion process, and frequency and amplitude variations in the synchro information and reference signals which give rise to erroneous information. The three-wire amplitude modulated fixed phase synchro stator output is converted to a two-phase phase modulated constant peak amplitude carrier by a circuit arrangement employing a parallel network comprising a differentiator and an integrator which ensures immunity from undesirable variations in the synchro output. A similar network and corresponding treatment is provided the sampled reference signal (the a.c. applied to the synchro's rotor) to ensure a usable azimuth control reference waveform which is free from the effects of variations in the sampled reference which give rise to error. The treated reference waveform is then sampled by the converted carrier waveform such that the phase at which the sampling occurs changes with the antenna rotation.

6 Claims, 3 Drawing Figures

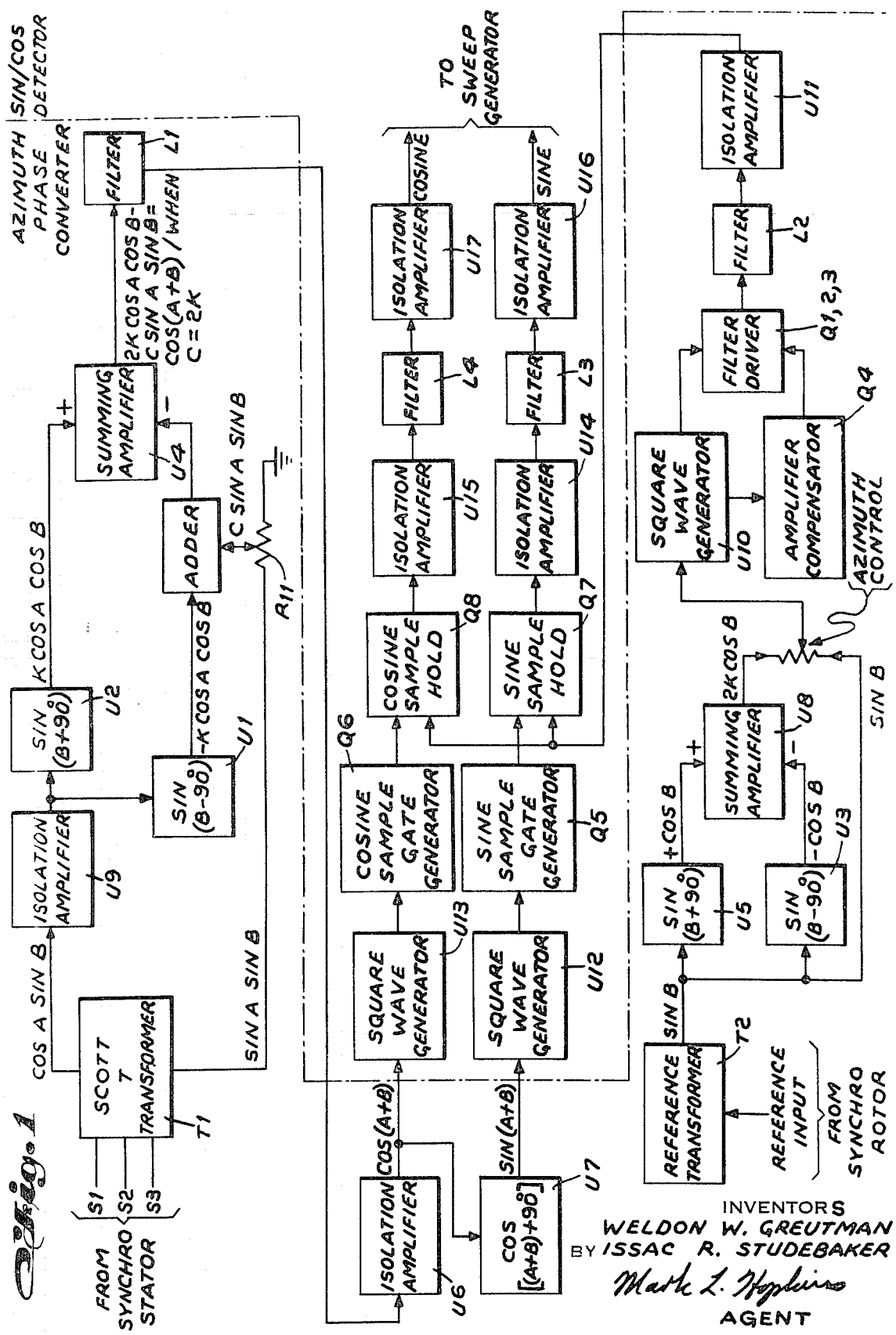

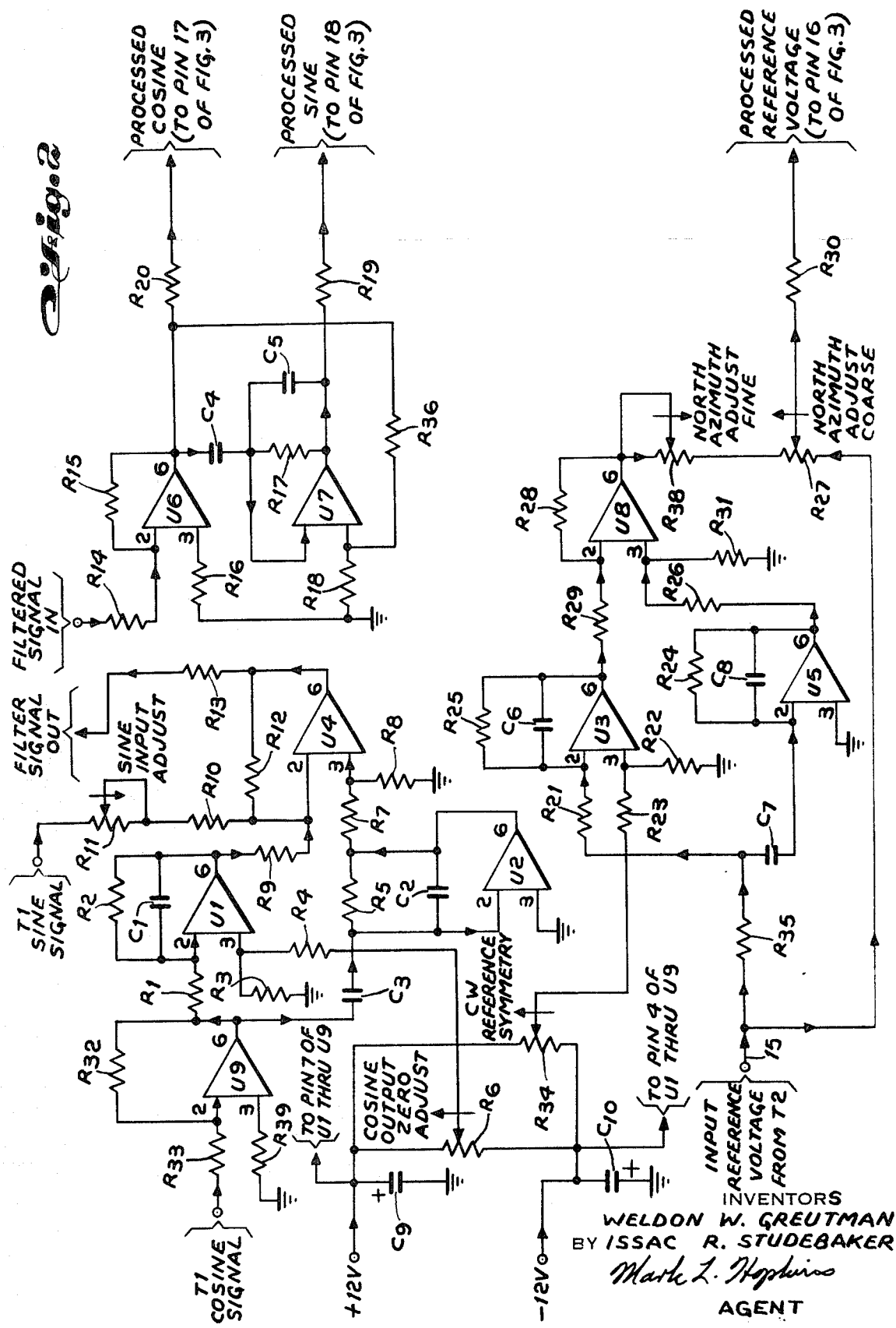

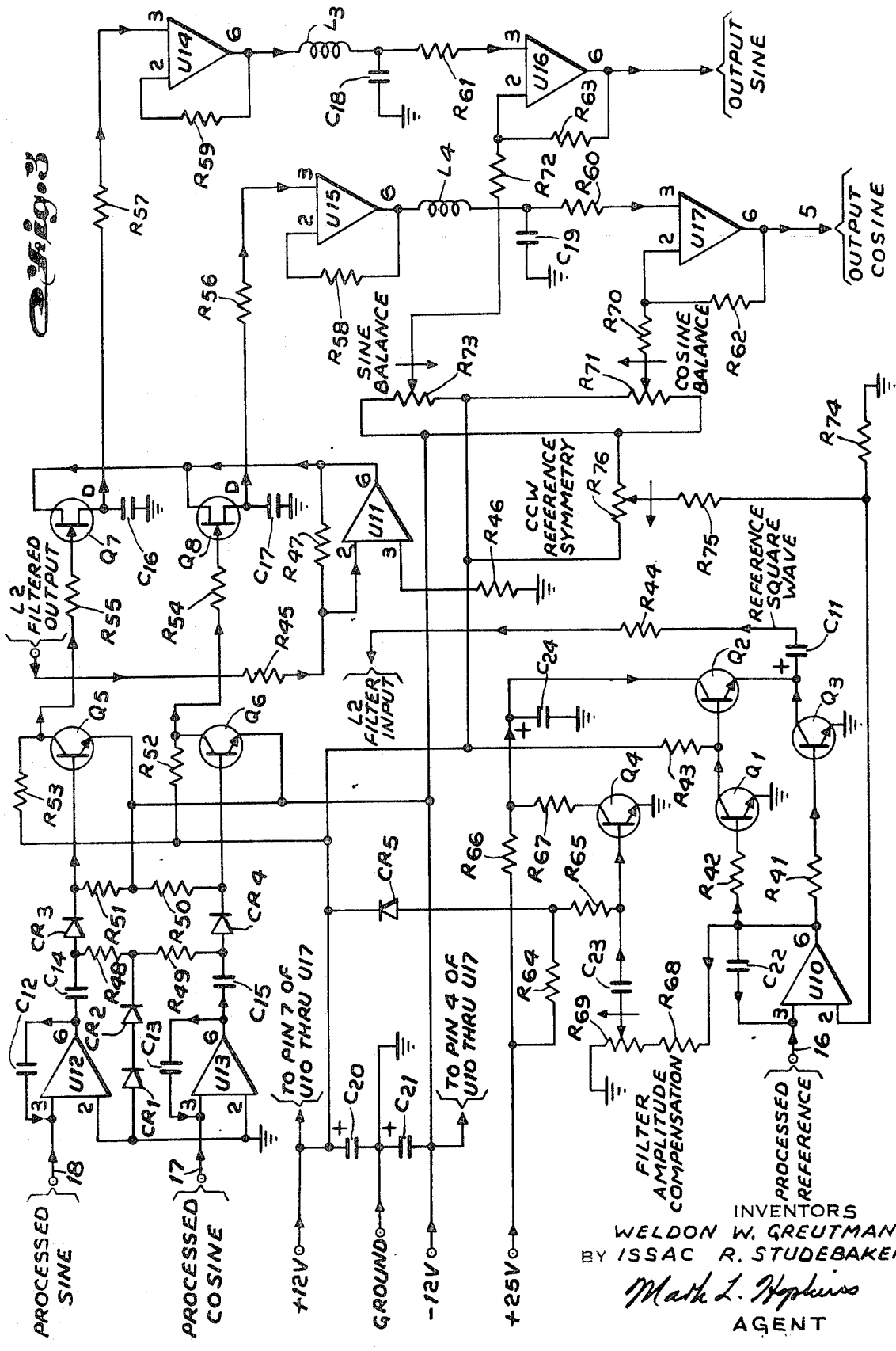

SYNCHRO TO SIN/COS CONVERTER

BACKGROUND OF THE INVENTION

In general this invention relates to a synchro to sin/cos coversion arrangement, and more particularly to a radar resolver arrangement for converting conventional five-wire antenna information (single speed three-wire plus reference) from the synchro to sine and cosine signals representative of the rotation (azimuth) of the antenna.

A major problem in designing radar repeaters is to make the display scanning beam follow the radar antenna in azimuth. Previously this was accomplished through the use of rotating machinery turning a sweep resolver shaft or a rotating deflection yoke. The resolver shaft or deflection yoke was forced to follow the radar antenna in azimuth through the use of a servo system. This type of arrangement proved to be bulky and had the disadvantages of moving parts, which inherently gave rise to the related problems of lubrication, gear back lash, costs, accuracy, speed, stability of the servo system, and reliability.

Later arrangements employing the above-mentioned type of conversion were developed to eliminate the rotating machinery through the use of for example transolvers. These arrangements suffer, however, from the common disadvantage that frequency changes in the sampled reference (i.e., the sampled sinusoidal a.c. line signal applied to the antenna synchro rotor) and the three-phase synchro carrier output (i.e., the output from the stator portion of the antenna synchro) carrying antenna position information result in erroneous changes in azimuth and amplitude regarding the PPI (Plan Position Indicator) sweeps. This disadvantage is compounded in these arrangements by their inability to successfully combat the effects of noise accompanying the synchro output information or reference signal. Moreover, the generation of harmonics arising out of the conversion of the antenna synchro output information contributes to resultant error.

SUMMARY OF THE INVENTION

It is therefore an object of this invention to provide a conversion arrangement of the above-defined kind which renders the sin/cos output signals immune to antenna synchro reference and carrier amplitude changes and frequency changes at least within a range of ± 5%.

It is another object of this invention to convert the three-phase amplitude modulated fixed phase carrier output from the synchro to a two-phase phase modulated constant peak amplitude carrier which is immune to input frequency and amplitude variations.

It is a further object of the invention to provide a reference output waveform which is unaffected by input frequency and amplitude changes in the sampled reference.

It is yet another object of this invention to provide a converter of the above-defined kind which is immune to noise accompanying the antenna synchro output information and to harmonics produced in the conversion process of the antenna synchro.

According to the broader aspects of the invention, there is provided a synchro to sin/cos converter which comprises first means for converting the three-phase amplitude modulated fixed phase carrier output from the synchro's stator to a two-phase phase modulated constant peak amplitude carrier output waveform, in a manner which renders the information contained in the converted carrier waveform unaffected by noise, by amplitude and frequency variations of the synchro output within predetermined limits, and by harmonics which arise in the conversion process; and reference means for converting the sampled reference signal from the synchro's rotor to an output reference waveform which is unaffected by amplitude and frequency variations in the sampled reference signal within predetermined limits. Further means are provided for coupling the reference output waveform and the converted carrier output waveform such that the phase at which the reference output waveform is sampled by the coverted carrier waveform changes synchronously with the rotated information from the synchro.

A feature of the invention is that the conversion arrangement may be incorporated in a radar system wherein the output of the radar antenna synchro may be converted to a phase modulated sin/cos carrier waveform which is representative of the antenna position and the sampled reference converted to an output reference waveform for azimuth adjustment control such that both the carrier and reference waveforms are immune from frequency and amplitude variations giving rise to erroneous azimuth information.

BRIEF DESCRIPTION OF THE DRAWINGS

The above-mentioned and other objects and features of this invention will become more apparent by reference to the following description taken in conjunction with the accompanying drawings, in which:

FIG. 1 is a block diagram illustrating the conversion arrangement according to the invention in its relation to the three-phase carrier and reference outputs from the antenna synchro and to the succeeding sin/cos detector stage in a radar system; and FIGS. 2 and 3 are schematic diagrams illustrating the circuitry of the block diagram of FIG. 1.

DESCRIPTION OF THE PREFERRED EMBODIMENT

Referring to the figures, a synchro to azimuth sin/cos coverter is illustrated therein in which the three-phase signals S1–S3 from the antenna synchro transmitter are applied to three-phase inputs of a transolver or a "Scott T" transformer T1.

The element T1, in accepting the three-phase position information, generates a rotating field as the information is rotated. Its output is two-phase information as generated from the applied three-phase information, with the output amplitudes being proportional to the sin/cos of the angle of rotation as indicated in FIG. 1. One output of the "Scott T" transformer T1 is in the form of Cos A Sin B wherein the signal information representative of the antenna azimuth, i.e., the Cos A of azimuth, is modulating the carrier frequency of Sin B. The amplitude modulated fixed phase output signal Cos A Sin B is fed through an isolation amplifier U9 to prevent transformer loading and is then split and fed simultaneously to an integrator stage U1 and a differentiator stage U2. Stages U1 and U2 shift the phase of the carrier 90° from the incoming signal phase, wherein at its output (pin 6) the differentiating stage U2 causes the carrier to lead the incoming signal phase by 90° and the integrating stage U1 correspondingly causes the carrier output (pin 6) to lag the input by 90°. The output signals from stages U2 and U1 are respectively referred to in FIG. 1 as K Cos A Cos B and − K Cos A Cos B. As a result, if a frequency change occurs in the incoming signal, i.e. the three-phase output from the synchro's stator, the outputs of stages U1 and U2 will change in opposite directions. These two outputs are divided down at the inputs to summing amplifier U4. However, while the output of differentiator U2 is coupled directly to the summing amplifier U4, the integrator U1 output is added to a portion of the incoming Sin A azimuth signal from the "Scott T" transformer T1 (i.e., Sin A Sin B) via a potentiometer R11, with the resultant thereof being coupled to the inverted input of the summing amplifier U4. The signal at the wiper of potentiometer R11 is given as C Sin A Sin B. The output of amplifier U4 is a phase modulated a.c. signal whose phase is changing in synchronism with the rotational azimuth of the radar antenna. The output of amplifier U4 is represented in FIG. 1 by the summation formula of:

2K CosA CosB − C SinA SinB = Cos(A+B), where C=2K.

This signal is then fed to filter L1 to remove the unwanted harmonics. The output of filter L1 is in turn coupled to isolation amplifier U6 which is employed in the circuitry to prevent filter loading. From amplifier U6 the phase modulated cosine signal is coupled to the sin/cos detector and also to a differentiator U7. The pin-6 output signal of differentiator U7 leads the cosine input by 90° in phase thereby constituting a sine signal, which is then also coupled to the sin/cos detector.

In the circuit combination of differentiator U2 and integrator U1, there is found the means for rendering the processed phase modulated converter output unaffected by frequency changes over at least the range of ± 5%. Inasmuch as the nominal frequency of input received from the stator outputs of the antenna synchro is 60 cycles, i.e., line current/voltage, the present invention provides therefore a tolerance in frequency variation between 57 and 63 Hz. An arrangement having no provision to combat variations in the carrier frequency would require more conventional means for shifting the phase of the carrier, say the Cos A Sin B, by 90° with respect to the Sin A Sin B signal in order to be able to sum the two and arrive at the trigometric identity of Cos (A+B). However, via the combination of integrator U1 and differentiator U2 this criterion is met while providing at the same time an insensitivity to frequency variation in the input within the stated limits. For example, if at the input differentiator U2 the frequency were to increase, the amplitude output thereof would increase and the amplitude output of integrator U1 would decrease correspondingly. From the inventive arrangement, therefore, phase modulated cosine and sine signals are derived with constant peak amplitude irrespective of the azimuth of the antenna, which signals, in being unaffected by frequency variations in the input, may be used upon detection to control the north-south and east-west sweep circuits respectively of a PPI.

To produce a usable reference signal for azimuth control which is also unaffected by frequency changes in the reference input (the vast majority of variations occurring within the above-stated limits of ± 5%), the reference input signal must be processed the same as indicated hereinbefore for the three-phase antenna synchro carrier signal. The sampled reference from the synchro's rotor designated as "reference input" in FIGS. 1 and 2 is coupled to reference transformer T2, which is a step-down transformer. Transformer T2 serves to process the input reference signal in order to substantially eliminate the effects of any common mode modulation associated therewith. The output of the transformer T2 is fed in parallel to integrator stage U3 and differentiator stage U5 by way of pin 15 (FIG. 2). Stage U3, with network R21 and C6, forms an integrator which produces a −cosine B function from the Sin B input; and stage U5 with network R24 and C7, forms a differentiator which produces a +cosine B function from the incoming Sin B. Therefore, as the incoming frequency signal changes, the output of stages U3 and U5 will change in opposite directions. These two outputs are then divided down at the differential inputs of summing amplifier U8. The output of summing amplifier U8 is an unmodulated reference signal which is unaffected by frequency changes in the input. The output of summing amplifier U8, designated as 2K Cos B, is coupled to one side of azimuth control potentiometer R27. The parallel input to stages U3 and U5, i.e., Sin B, is also coupled to the other side of potentiometer R27. R27 acts as an adder to these inputs, wherein the phase of the sampling reference output waveform is changed in accordance with the position of the azimuth control wiper arm, permitting thereby adjustment in the azimuth to correlate to the absolute azimuth of the antenna. In order to achieve an accurate reference sampling, the amplitude ratio of the two inputs to potentiometer R27 must remain constant.

The processed reference waveform on the wiper arm of azimuth control R27 is applied by way of input 16 (FIG. 3) to a squaring circuit consisting of stage U10 and element C22. This stage is in turn coupled to an amplitude compensation network which includes Q4, and also to a filter driving circuit consisting of transistor stages Q1, Q2, and Q3. In the filter driving circuit Q1–Q3, Q3 is fired on one-half cycle of the square waveform from stage U10, to establish ground reference to the filter L2. On the opposite half cycle abovementioned, Q3 and Q1 are turned off. Q1 turns Q2 on in order to drive the filter L2 with a voltage level which is established by the operation of pulse stretcher Q4. Stage Q4 is activated during the positive excursions of the signal from squaring circuit U10, and the length of its turned-on time is determined by the network of elements C23 and R65, as well as the setting of filter amplitude compensation adjustor R69. As the frequency of the reference voltage at the input decreases for example, stage Q4 will be activated a proportionately longer time of the square wave cycle. Therefore, the average voltage on the collector of stage Q2 will be higher as the frequency increases and lower as the frequency decreases. In this way the voltage at the filter L2 input is compensated to make up for the roll-off of the low-pass filter L2 around 60 Hz. The filter L2 is designed to remove any high frequency harmonics above 60 Hz. The output of filter L2 is coupled to isolation amplifier U11 which is employed to prevent filter loading. The output of stage U11 is the processed reference waveform which is immune to frequency changes in the sampled input at least within the range of ± 5%.

The processed reference waveform from stage U11 is sampled by the azimuth sine and cosine converted carrier waveforms by way of the sin/cos detector circuitry as indicated in the figures, and in particular via switching stages Q7 and Q8 and sample and hold capacitors C16 and C17 (FIG. 3). The converted azimuth sine and cosine carrier waveforms at the inputs 18 and 17 respectively are processed through identical channels; therefore only one (sine) channel will be described. The frequency of the sinusoidal signal at input 18 is the carrier frequency plus the antenna rotational speed. This signal is coupled to a squaring or zero-crossing detector circuit consisting of stage U12 and the element C12. The square wave signal present at pin 6 of stage U12 is then differentiated by the network consisting of elements C14 and R48. A negative pulse on the base of transistor Q5 turns this sine sample gate generator off. At this time the collector voltage of Q5 rises to +12 volts for a time interval as determined by the network C14 and R48. With the collector of Q5 at +12 volts, FET (Field Effect Transistor) switch Q7 is activated for a short interval in order to charge element C16 to the level at pin 6 of isolation amplifier stage U11. The sine sample and hold stage Q7 is in turn coupled to isolation amplifier U14 the purpose of which is to isolate capacitor C16 from the filter L3 and thereby preventing C16 from discharging during non-sample time. Filter L3 smooths out the sampled signal, which is then applied to a further isolation amplifier stage U16 which prevents excessive filter loading. The output at pin 6 of stage U16 is a sinusoidal signal which varies in frequency and amplitude as the radar antenna changes in speed and azimuth. This waveform and the waveform present at the output 5 (cosine waveform) are then coupled to the sweep generator.

In the above description there has been demonstrated a novel synchro to azimuth sin/cos converter arrangement in a radar system which includes first means for converting the amplitude modulated antenna synchro output signal representative of the radar antenna's position to a phase modulated constant peak amplitude sin/cos carrier waveform, and reference means for converting the sampled synchro reference signal into an azimuth adjustment reference waveform, which waveforms are immune to frequency and amplitude variations in the synchro's reference and output signals, which give rise to erroneous azimuth information, and to noise and harmonics generated in the conversion process of the antenna synchro.

It is to be understood that the foregoing description of specific apparatus is made by way of example only and is not to be considered as a limitation to the scope of this invention.

What is claimed is:

1. A synchro to sin/cos converter arrangement comprising:
   a. first means for converting an input amplitude modulated fixed phase synchro output carrier signal to a phase modulated constant peak amplitude sin/cos output carrier waveform which is unaffected by frequency changes in the input thereto over a predetermined range and the phase of which changes synchronously with the rotated information from the synchro, said first means including second means for receiving a synchro output signal and providing first and second antenna information signals in response thereto, third means including first differentiating means and first integrating means input coupled in parallel to said first antenna information signal, said first differentiating means and said first integrating means providing outputs respectively plus and minus 90° shifted in phase from the input thereto, adding means coupled to said first integrating means and to said second means for receiving said second antenna information signal from the latter and adjustably coupling same with said phase shifted output from said first integrating means, and output-filtered summing means coupled to said first differentiating means and said adding means for providing from the respective signals received therefrom said phase modulated output carrier waveform;
   b. reference means, responsive to a sampled input unmodulated synchro reference signal, for producing a reference waveform which is unaffected by frequency changes in the input thereto over a predetermined range, said reference means including fourth means for receiving said input synchro reference signal and providing therefrom an output which is substantially free of the effects of common mode modulation associated with said input reference signal, second differentiating means and second integrating means input coupled in parallel to said fourth means for providing outputs respectively plus and minus 90° shifted in phase from the input thereto, reference summing means, coupled to said second differentiating means and said second integrating means, for providing an output signal representative of the sum of said inputs thereto, and azimuth control means coupled to said reference summing means and to said fourth means for receiving the respective output signals thereof and operatively combining same to provide an output reference signal which is adjustable to correlate with the absolute position of the synchro; and
   c. fifth means for coupling said first means and said reference means, said fifth means including sixth means for sampling said output reference signal with the output signals of said first means such that the phase at which the reference waveform is sampled by the converted carrier waveform provides resultant sine and cosine outputs representing the synchro's position.

2. The arrangement according to claim 1 wherein said second means include parallel sampling and filtering means by which said reference output waveform is sampled by the converted carrier waveforms from said first means, wherein sinusoidal and cosinusoidal signals are derived which vary in frequency and amplitude as the radar antenna changes speed and azimuth.

3. The arrangement according to claim 1 wherein said first means further includes seventh means coupled to said summing means, said seventh means including filter means for removing unwanted harmonics from the summing means output, and isolation and differentiating means coupled to said filter means for providing separate outputs from the signal output of said filter means which are 90° in phase relative to each other 4. The arrangement according to claim 1 wherein said reference means further include filter driving circuit means coupled to the output of said azimuth control means for providing a square wave reference waveform output the duty cycle of which varies proportionately with the frequency of the input thereto.

5. The arrangement according to claim 4 wherein said filter driving circuit means include a squaring circuit coupled to the output of said azimuth control means, an amplitude compensation circuit coupled to said squaring circuit, and a filter driving circuit coupled to the output of said squaring circuit and said amplitude compensation circuit.

6. The arrangement according to claim 5 wherein said reference means further include filter means for removing the unwanted harmonics from the output of said filter driving circuit means.

* * * * *